Patented Nov. 9, 1937

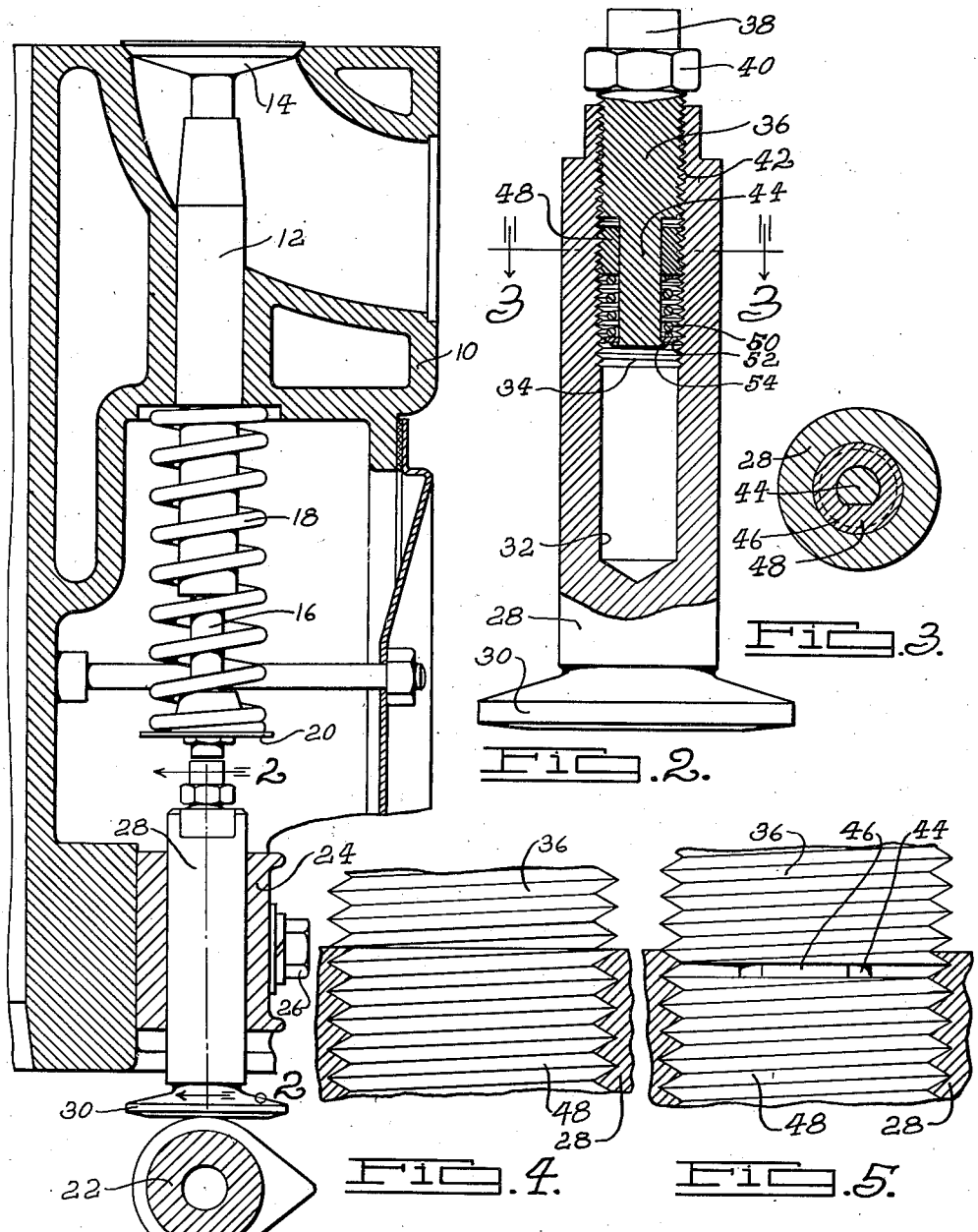

2,098,897

UNITED STATES PATENT OFFICE 2,098,897

VALVE TAPPET

Henry Haild Zeder, Detroit, Mich., assignor, by mesne assignments, to Eaton Manufacturing Company, Detroit, Mich., a corporation of Ohio Application September 11, 1935, Serial No. 40,009

5 Claims. (Cl. 123—90)

This invention relates to a valve tappet and more particularly to that type of a valve tappet in which the valve engaging portion is axially adjustable relative to the cam engaging portion.

It is customary in internal combustion engines of the poppet valve type to provide an axially adjustable tappet between the valve and a cam. The adjustment is provided to take up for wear and such adjustment is usually accomplished by turning the valve engaging portion relative to the cam engaging portion, the former being screw threaded into the latter. The constant hammering of the parts during operation causes the threads of the screwthreaded parts to engage first one side of the thread and then the other and such action causes a wearing of the threads resulting in a loose and noisy connection between the valve engaging portion and the cam engaging portion. Further than this the looseness permits relative turning and the parts become out of adjustment.

It is an object of this invention to provide a locking device between the valve engaging portion and the cam engaging portion.

Another object of the invention is to provide a locking device which is carried by the valve engaging portion and which, when assembled, is spaced from the valve engaging portion with resilient tension between said parts.

A further object of the invention is to form the locking member with screwthreads on its outer periphery corresponding with the screwthreads on the outer periphery of the valve engaging member but to retain the parts against relative angular movement with the leading end of the thread on one member out of registration with the trailing end of the thread on the other member.

Other objects and advantages of the invention will more fully appear from the following description taken in connection with the accompanying drawing, in which:

Fig. 1 is a sectional view of a portion of an internal combustion engine showing an adaptation of my improved valve tappet in elevation;

Fig. 2 is an enlarged view of the valve tappet, the major portion thereof broken away and shown in section;

Fig. 3 is a sectional view taken on line 3—3 of Fig. 2;

Fig. 4 is a fragmentary view of a portion of the valve engaging member and a portion of the locking member showing the misalignment of the screw threads when the parts are in engagement; and, Fig. 5 is a view corresponding to Fig. 4 but showing a separation of the parts and alignment of the screw threads.

Referring to the drawing, I have illustrated a cylinder block 10 having a valve guide 12 in which is reciprocally mounted a valve 14 having a stem 16. The usual valve spring 18 is arranged between the block 10 and a removable abutment 20 carried by the stem 16. The cam shaft is illustrated at 22. Between the cam shaft 22 and the lower end of the valve stem 16 I have illustrated my improved tappet which is mounted in a bearing member 24 which is detachably secured to the block 10 by bolts 26.

The valve tappet comprises a cylindrical body portion 28 which has an enlarged flattened portion 30 for engagement with the cam shaft. Referring to Fig. 2 it will be seen that the body portion 28 is longitudinally bored as at 32 and threaded as at 34 to receive a screw, either of the conventional type or of my improved type, for varying the length of the tappet to permit adjustment between the lower end of the valve stem 16 and the cam shaft 22.

My improved screw and its locking member are adapted to be screwthreaded as a unit into the threaded bore 32. The screw comprises a body portion 36 which has a portion 38 for engagement with the valve stem 16 and a tool engaging portion 40 shown as a hexagon. Below the portion 40 is a screwthreaded follower portion 42 for engagement with screwthreads 34. Below the portion 42 is a reduced annular portion 44 having a flattened wall 46 extending substantially the entire length of the annular portion 44. A locking member or leader 48 has its outer periphery threaded to conform to the threaded follower portion 42 and has an annular opening with a flattened wall portion, corresponding in contour to the annular portion 44, to have longitudinal sliding movement on the reduced annular portion 44. A tension member 50, shown as a coil spring is arranged on the annular portion 44 below the leader member 48 and is held under compression by its engagement with an abutment on the lower end of annular portion 44. The abutment shown consists of a washer 52 secured to the end portion by riveting as at 54.

When the parts 36, 48, 50 and 52 are assembled as a unit for insertion into the part 28, the adjacent faces of the parts 36 and 48 are in close contact and held against relative angular movement with the leading end of the thread on the part 36 out of alignment with the trailing end of the thread on the part 48 as shown in Fig. 4. When the parts are turned to screw the members inwardly the leader member 48 moves away from the lower face of the member 36 against the compression force of the spring 50 due to the fact that the leading end of the thread at 42 does not register with the leading end of the thread 34 in the member 28 or the trailing end of the thread on the leader member 48. This separation is clearly shown in Fig. 5.

The compression spring 50 thereby exerts a downward pressure on the member 36 and an upward pressure on the leader member 48 thus preventing any relative movement between the threads on the member 36 and the threads in the member 28. This frictional resistance also prevents relative turning movement of the parts and thereby maintains constant adjustment without wear on the threads.

It will be understood that various changes including the size, shape and arrangement of parts may be made without departing from the spirit of my invention and it is not my intention to limit its scope other than by the terms of the appended claims.

I claim:

1. A valve tappet comprising a main body part having a valve engaging portion at one end and including a reduced opposite end portion of out-of-round cross section and an intermediate externally threaded cylindrical portion having a continuous and uninterrupted annular shoulder adjacent said reduced end portion, the threads of said intermediate portion extending to and completely throughout the periphery of said shoulder, an externally threaded locking member having a central out-of-round passage corresponding in cross section with the cross section of said reduced end portion and slidably mounted on the latter, said locking member having a continuous extremity adjacent said shoulder of said body part and the threads thereof being circumferentially continuous adjacent said extremity, an abutment on the end of said reduced end portion remote from said shoulder, and a compression spring bearing between said abutment and said locking member for urging said extremity thereof toward said shoulder, the leading and trailing end portions of the threads on said intermediate portion and locking member respectively being non-complementary and out of registration with each other when said shoulder and said extremity of said locking member are engaged together.

2. A tappet body having a head at its lower end and an oppositely extending hollow shank above said head and open at its upper end, said hollow shank having a continuous internal thread, a screw structure comprising an externally threaded leader part and an externally threaded follower part yieldingly connected for relative axial movement and adapted for screw-thread engagement with said hollow shank, said follower part having the leading portion of its thread above the threads of said leader part and out of overlapping relation therewith and constructed so that it is retained against relative rotation with respect to said follower part, said leader part and said follower part having external screw threads out of continuous helical alignment when said follower part is out of screw-thread engagement with said internally threaded shank, but in continuous helical alignment when said follower and said leader are in screw-thread engagement with said internally threaded shank by the relative axial movement of said leader part and said follower part.

3. A tappet body having a head at its lower end and an oppositely extending hollow shank above said head and open at its upper end, said hollow shank having a continuous internal thread, a screw structure comprising an externally threaded leader part and an externally threaded follower part yieldingly connected for relative movement and adapted for screw-thread engagement with said hollow shank, said follower part having the leading portion of its thread above the threads of said leader part and out of overlapping relation therewith and constructed so that it is retained against relative rotation with respect to said follower part, said leader part and said follower part having external screw threads out of continuous helical alignment when said follower part is out of screw-thread engagement with said internally threaded shank, but in continuous helical alignment when said follower and said leader are in screw-thread engagement with said internally threaded shank by the relative movement of said leader part and said follower part.

4. A tappet body having a head at its lower end and an oppositely extending hollow shank above said head and open at its upper end, said hollow shank being internally threaded, and a screw structure comprising externally threaded leader and follower parts adapted to engage the threads of said hollow shank, said follower part having the leading portion of its thread disposed above the threads of said leader part and out of overlapping relation therewith, the threads of said leader part being out of continuous helical alignment with the threads of said follower part when said follower part is out of threaded engagement with the threads of said hollow shank, and means connecting said leader part and said follower part together, said means being arranged and constructed so as to prevent rotation of said leader part with respect to said follower part and to permit continuous helical alignment of the threads of said leader and follower parts when both of said parts are in threaded engagement with the threads of said hollow shank.

5. An element for use with a threaded tappet body or the like, comprising a leader part and a follower part, each of said parts being screw-threaded, the leading portion of the threads of said follower part being disposed above the threads of said leader part and out of overlapping relation therewith, the threads of said leader part being out of continuous helical alignment with the threads of said follower part when said follower part is out of threaded engagement with said tappet body, and means connecting said leader part and said follower part together, said means being arranged and constructed so as to prevent relative rotation of said leader part with respect to said follower part and to permit continuous helical alignment of the threads of said leader and follower parts when both of said parts are in threaded engagement with the threads of said tappet body.

HENRY HAILD ZEDER.